US011549960B2

(12) United States Patent
Keast et al.

(10) Patent No.: US 11,549,960 B2
(45) Date of Patent: Jan. 10, 2023

(54) SYSTEM AND METHOD FOR MONITORING ONE OR MORE PARAMETERS OF A TOP DRIVE WITH A SINGLE SENSOR

(71) Applicant: Larry G. Keast, Houston, TX (US)

(72) Inventors: Larry G. Keast, Houston, TX (US); Stephen Lee Gerhauser, Jr., Houston, TX (US)

(73) Assignee: Larry G. Keast, Houston, TX (US)

( * ) Notice: Subject to any disclaimer, the term of this patent is extended or adjusted under 35 U.S.C. 154(b) by 377 days.

(21) Appl. No.: 16/900,297

(22) Filed: Jun. 12, 2020

(65) Prior Publication Data

US 2021/0389341 A1    Dec. 16, 2021

(51) Int. Cl.
*G01P 3/49* (2006.01)
*E21B 3/02* (2006.01)
*G01D 5/244* (2006.01)

(52) U.S. Cl.
CPC ............... *G01P 3/49* (2013.01); *E21B 3/022* (2020.05); *G01D 5/244* (2013.01)

(58) Field of Classification Search
CPC ............ G01P 3/49; E21B 3/022; G01D 5/244
See application file for complete search history.

(56) References Cited

U.S. PATENT DOCUMENTS

| | | | |
|---|---|---|---|
| 4,142,153 A * | 2/1979 | Smith | G01P 3/49 341/15 |
| 4,890,681 A | 1/1990 | Skelly | |
| 6,877,942 B2 | 4/2005 | Eastcott | |
| 7,163,367 B2 | 1/2007 | Handley | |
| 8,387,720 B1 | 3/2013 | Keast et al. | |
| 8,807,208 B1 | 8/2014 | Keast | |
| 8,840,352 B2 | 9/2014 | Taggart et al. | |
| 9,249,655 B1 | 2/2016 | Keast et al. | |
| 10,550,640 B2 * | 2/2020 | Orban | G01L 5/00 |
| 2016/0060982 A1 | 3/2016 | Layden | |
| 2017/0198534 A1 | 7/2017 | Folk | |
| 2018/0156936 A1 * | 6/2018 | Zhang | G01V 3/18 |

* cited by examiner

*Primary Examiner* — Reena Aurora
(74) *Attorney, Agent, or Firm* — Kearney, McWilliams & Davis, PLLC; John M. DeBoer

(57) ABSTRACT

A top drive system comprising a drilling rig, and a top drive unit operatively associated with the drilling rig. The top drive includes a top drive housing, and a rotatable member having a first member portion within the top drive housing, and a second member portion extending outward from the top drive housing. There is a sensor assembly disposed within the top drive housing, the assembly comprising a sensor configured to provide an output signal associated with an at least one parameter of the top drive. The first member portion is configured with a profile sensed by the sensor assembly.

18 Claims, 10 Drawing Sheets

SYSTEM AND METHOD FOR MONITORING ONE OR MORE PARAMETERS OF A TOP DRIVE WITH A SINGLE SENSOR

STATEMENT REGARDING FEDERALLY SPONSORED RESEARCH OR DEVELOPMENT

Not applicable.

BACKGROUND

Field of the Disclosure

This disclosure generally relates to drilling wells and other rotatable machinery, tools, systems, and the like, such as those used for industrial purposes. More specifically, the disclosure relates to a way of using linear approximation principles in conjunction with a rotating feature to measure or determine one or more parameters associated with an operation such as drilling (and associated equipment, like a top drive).

Background of the Disclosure

When drilling for oil or gas, a wellbore is typically drilled using a drill bit attached to the lower end of a "drill string." The process of drilling a well typically includes a series of operations such as drilling, tripping, casing and cementing, and repeating as necessary. The process of doing well servicing on a previously drilled, completed, and producing well uses many of the same operations although rotation is only required for operations such as milling out a packer and/or sometimes for drilling the well deeper.

FIG. 1 shows a simplified view of a conventional drilling operation 100. A derrick 102 (or drilling rig) is configured to rotate a drill string 104 that has a drill bit 106 disposed at a lower end of the drill string 104, typically using a power swivel/top drive 110 and associated equipment. The power swivel/top drive 110 rotates the string 104 and the drill bit 106 to do drilling or milling work downhole in the wellbore 108.

Near the derrick 102, a plurality of tubular members 103a are often stored on a pipe rack(s) 112. The pipe rack 112 is relatively near the ground, and substantially below the rig floor 115. Therefore, tubulars 103, 103a must be transported to the rig floor 115 joint by joint for use in drilling or servicing operations.

In working with tubulars, it is imperative to have an understanding of operational aspects associated therewith, such as, for example, speed of rotation (rpm), direction of rotation, and orientation of the drill string when stopped. This is especially the case now that directional or horizontal drilling is prevalent. Therefore, attempts have been made to monitor or measure performance of the top drive 110 (or components thereof) including such parameters.

Prior art techniques for top drive performance measurement include the use of direct sensors used for each of, for example, temperature, pressure, and flow. For rotation, magnetic pickup sensors which can include a gear tooth profile or even a ferrous metal piece fastened in any crude way available in the field to the rotating member, along with rotary (or shaft) encoders.

However, when it comes to rotational-related measurement, these conventional solutions are problematic, difficult to install correctly, or oversimplified for convenience— sacrificing accuracy. For example, rotary encoders are highly prone to failure, especially due to vibrational issues, and are often overly complex. Moreover, the encoder itself is involved in the rotation (i.e., it rotates, and is not stationary), and as such, lose accuracy over time (meaning after millions of rotations, the tolerance associated with the measurement worsens). When the sensor fails, substantial downtime is needed, as the sensor is often attached to the rotating string in some fashion.

The top drive housing is stationary while a rotatable member moves therein. This means lubricant (such as hydraulic fluid or oil) is needed within the housing, which hinders the operation sensors that have optical or other forms of sensing effected by the presence of such a medium. Current solutions for gathering rotary information are not capable of many of the requirements necessary for this type of application; such as needing to meet environmental specifications, adapt to current devices without having to re-engineer designs eliminating field interchangeability, cannot withstand pressure requirements, or be installed in any medium except air.

A need exists in the art for an improved and elegant solution to obtain performance data associated with operation of a top drive. A need exists for obtaining information from a single sensor source, where the sensor need not rotate, and/or the sensor may be disposed or in contact with (at least partially) a liquidous medium, such as lubricant or hydraulic fluid operated under a pressure. A need further exists for the sensor to have capability to operate in a hazardous environment (such as Class 1, Div 2 as defined by NEC and NFPA in the U.S.). A need exists for a sensor that can obtain or calculate multiple parameters associated with rotation such as direction of rotation and position sensing, and yet be easy to change or replace.

SUMMARY

Embodiments of the disclosure pertain to a drilling operation and associated equipment, such as a top drive system.

The top drive system may include a drilling rig and a top drive unit operatively associated with the drilling rig. The top drive unit may include any of a top drive housing; and a rotatable member having a first member portion within the top drive housing. There may be a second member portion extending outward from the top drive housing.

The system may include a monitoring module. The monitoring module may have a sensor assembly, such as an eddy current sensor assembly. The sensor assembly may include a sensor, such as an eddy current sensor. The sensor may be configured to provide an output signal associated with an at least one parameter of the top drive.

The system may include a converter unit operable to receive and convert the output signal into a wave signal. The converter unit may transfer to wave signal to a workstation. The wave signal may be characterized as sawtooth in nature.

The top drive system may include a user interface in operable communication with the sensor assembly and the workstation.

In aspects, the first member portion may be configured with a profile sensed by the sensor assembly (or the sensor thereof). The first member portion may be generally cylindrical. The first member portion may include a top side; a bottom side; and an outer side surface. The outer side surface may be configured with the profile.

In aspects, the profile further may, in lateral cross-section, have: a first edge having a radius r1, a second edge having a radius r2, and a null having a radius $r_{null}$, wherein $r2 > r1 > r_{null}$.

In lateral cross-section, an outer radial between the first edge and the second edge may increase in radial size at a rate in a range of 0.1 inches to 0.4 inches. In aspects, at least one of the first edge and the second edge extends entirely between the top side and the bottom side.

There may be a clearance between an end most surface of the sensor and a most lateral proximate point of the hub is no more than 1 inch. In aspects, the end most surface of the sensor may have an end width x2. The null may have a width x1. In other aspects, x1 may be greater than or equal to ½*x2. The clearance may be characterized as being discontinuous and unreadable.

The second member portion may be coupled with a workstring. The workstring may be made of a plurality of tubulars coupled together. There may be a drillbit coupled with a downhole end of the workstring.

Other embodiments herein pertain to a top drive system that may include a drilling rig; and a top drive unit operatively associated with the drilling rig. The top drive may include any of: a top drive housing; and a rotatable member having a first member portion within the top drive housing. There may be a second member portion extending outward from the top drive housing. There may be a monitoring module.

The monitoring module may include one or more components associated with another, such as a sensor assembly. The sensor assembly may include an eddy current sensor assembly. The sensor assembly may be disposed within the top drive housing. The assembly may include a sensor. The sensor may be an eddy current sensor. The sensor may be configured to provide an output signal associated with an at least one (operational) parameter of the top drive.

The first member portion may be configured with a profile sensed by the sensor assembly (or sensor thereof).

The system or module may include a converter unit operable to receive and convert the output signal into a wave signal. In embodiments, the wave signal may be sawtooth.

There may be a workstation in operable communication with the sensor assembly.

The first member portion may be generally cylindrical. The first member portion may include any of: a top side; a bottom side; and an outer side surface. The outer side surface may be configured with the profile.

Still other embodiments pertain to a top drive system that may include a drilling rig; and a top drive unit operatively associated with the drilling rig. The top drive unit may include one or more of: a top drive housing; and a rotatable member having a first member portion within the top drive housing, and a second member portion extending outward from the top drive housing.

There may be a sensor assembly disposed within the top drive housing. The assembly may include or be configured to generate an output signal associated with an at least one parameter of the top drive.

The first member portion may be generally cylindrical. The first member portion may include a top side; a bottom side; and an outer side surface. The outer side surface may be configured with the profile. The profile may include, in lateral cross-section: a first edge having a radius r1, a second edge having a radius r2, and a null having a radius $r_{null}$, wherein $r2 > r1 > r_{null}$.

These and other embodiments, features and advantages will be apparent in the following detailed description and drawings.

BRIEF DESCRIPTION OF THE DRAWINGS

A full understanding of embodiments disclosed herein is obtained from the detailed description of the disclosure presented herein below, and the accompanying drawings, which are given by way of illustration only and are not intended to be limitative of the present embodiments, and wherein.

DETAILED DESCRIPTION

Figure 1:
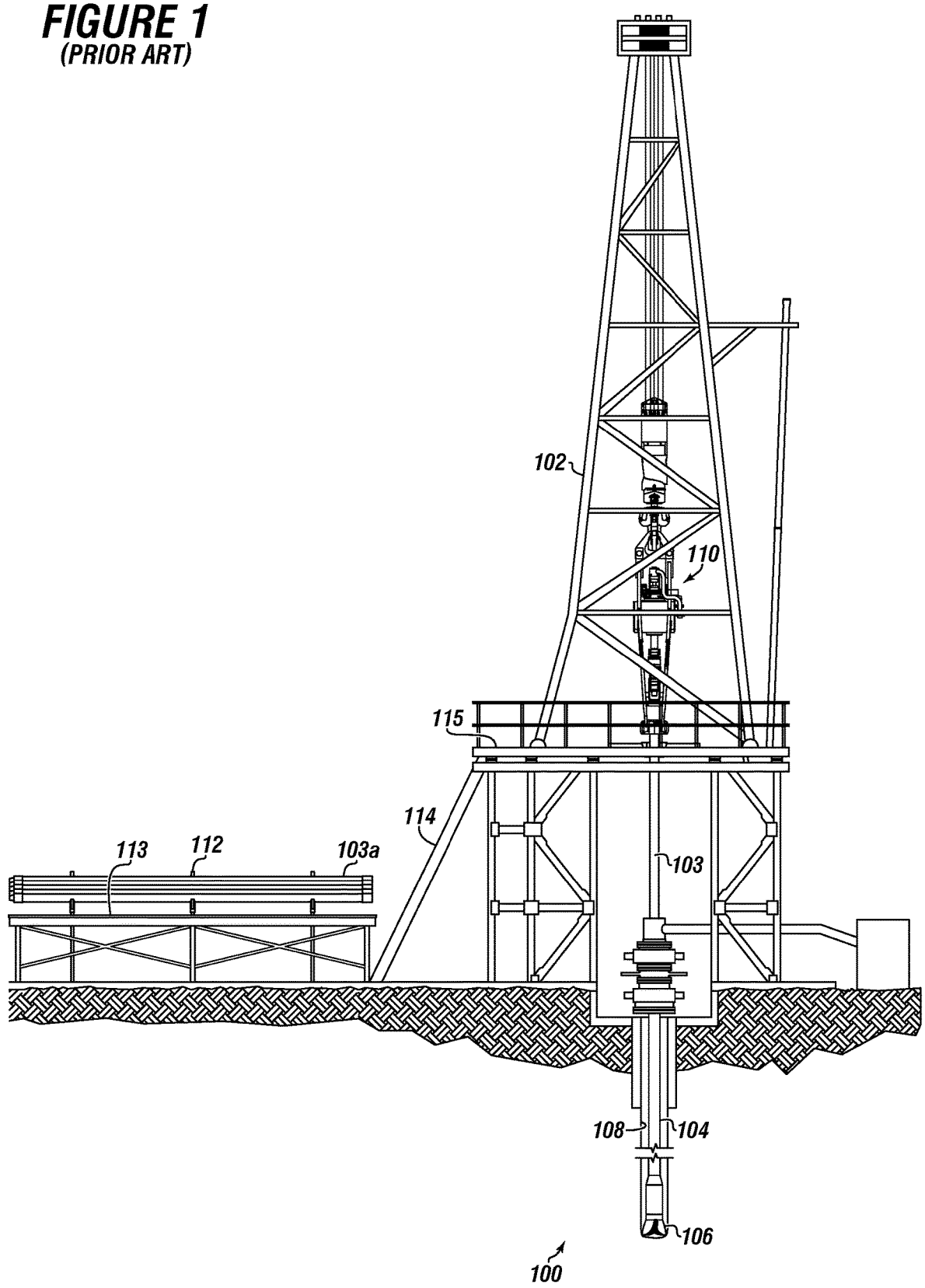
FIG. 1 is a side view of a process diagram of a conventional operation for an industrial process like an oil and gas production system.

Regardless of whether presently claimed herein or in another application related to or from this application, herein disclosed are novel apparatuses, units, systems, and methods that pertain to improved monitoring of a top drive or comparable, details of which are described herein.

Terms

The term "connected" as used herein may refer to a connection between a respective component (or subcomponent) and another component (or another subcomponent), which may be fixed, movable, direct, indirect, and analogous to engaged, coupled, disposed, etc., and may be by screw, nut/bolt, weld, and so forth. Any use of any form of the terms "connect", "engage", "couple", "attach", "mount", etc. or any other term describing an interaction between elements is not meant to limit the interaction to direct interaction between the elements and may also include indirect interaction between the elements described.

The term "fluid" as used herein may refer to a liquid, gas, slurry, single phase, multi-phase, pure, impure, etc. and is not limited to any particular type of fluid such as hydrocarbons.

The term "fluid connection", "fluid communication," "fluidly communicable," and the like, as used herein may refer to two or more components, systems, etc. being coupled whereby fluid from one may flow or otherwise be transferrable to the other. The coupling may be direct, indirect, selective, alternative, and so forth. For example, valves, flow meters, pumps, mixing tanks, holding tanks, tubulars, separation systems, and the like may be disposed between two or more components that are in fluid communication.

The term "pipe", "conduit", "line", "tubular", or the like as used herein may refer to any fluid transmission means, and may (but need not) be tubular in nature.

The term "workstring", "tubestring", "drillstring", or the like as used herein may refer to a plurality of tubulars (operatively) coupled together. There may be one or more peripheral components associated with the workstring, for example, a drill bit operatively coupled with one end, and a top drive operatively coupled on the other end.

The term "composition" or "composition of matter" as used herein may refer to one or more ingredients, components, constituents, etc. that make up a material (or material of construction). Composition may refer to a flow stream of one or more chemical components.

The term "skid" as used herein may refer to one or more pieces of equipment operable together for a particular purpose. For example, a 'catwalk-power swivel skid' may refer to one or more pieces of equipment operable together to provide or facilitate presenting a tubular to a derrick. A skid may be mobile, portable, or fixed. Although 'skid' may refer to a modular arrangement of equipment, as used herein may be mentioned merely for a matter of brevity and simple reference, with no limitation meant. Thus, skid may be comparable or analogous to zone, system, subsystem, and so forth.

The term "skid mounted" as used herein may refer to one or more pieces operable together for a particular purpose that may be associated with a frame- or skid-type structure. Such a structure may be portable or fixed.

The term "engine" as used herein may refer to a machine with moving parts that converts power into motion, such as rotary motion. The engine may be powered by a source, such as internal combustion.

The term "drive" (or drive shaft) as used herein may refer to a mechanism that controls or imparts rotation of a motor(s) or engine(s).

The term "motor" as used herein may be analogous to engine. The motor may be powered by a source, such as electricity, pneumatic, or hydraulic.

The term "pump" as used herein may refer to a mechanical device suitable to use an action such as suction or pressure to raise or move liquids, compress gases, and so forth. 'Pump' can further refer to or include all necessary subcomponents operable together, such as impeller (or vanes, etc.), housing, drive shaft, bearings, etc. Although not always the case, 'pump' may further include reference to a driver, such as an engine and drive shaft. Types of pumps include gas powered, hydraulic, pneumatic, and electrical.

The term "utility fluid" as used herein may refer to a fluid used in connection with the servicing of equipment, such as a lubricant or water. The utility fluid may be for heating, cooling, lubricating, or other type of utility. 'Utility fluid' may also be referred to and interchangeable with 'service fluid' or comparable.

The term "mounted" as used herein may refer to a connection between a respective component (or subcomponent) and another component (or another subcomponent), which may be fixed, movable, direct, indirect, and analogous to engaged, coupled, disposed, etc., and may be by screw, nut/bolt, weld, and so forth.

The term "sensor" as used herein may refer to a device that detects or measures a physical property and may record, indicate, or otherwise respond to it. The output of a sensor can be an analog or digital signal. The output may be processed, such as by a processor.

The term "eddy current sensor" as used herein may refer to a sensor that may include respective circuitry suitable to generate a digital signal or pulse based on a change in magnetic field. The sensor can include a device or element having an electric current running through it, and can further be associated with an amplifier and a trigger. The eddy current principle finds applications in the measurement of electrically conductive materials that may have ferromagnetic or non-ferromagnetic characteristics. A coil may be integrated in a sensor housing and energized by a current. The coil's electromagnetic field may induce eddy currents in a nearby conductive subject, causing the resulting current resistance of the coil to change. This change of impedance may cause an electrical signal which is proportional to the distance of the subject to the coil. An amount of voltage proportional to the change of impedance may be calculated.

The term "eddy current sensor assembly" as used herein may refer to an eddy current sensor, the sensor being operatively associated with one or more other components, such as a sensor housing, circuitry, wiring, and so forth. The sensor assembly may have operable connectivity between various components and subcomponents. The sensor assembly may be operatively part of or associated with a monitoring module.

The term "circuit board" (also 'printed' circuit board) as used herein may refer to a board that mechanically supports and electrically connects electronic components using conductive tracks, pads and other features. Components (e.g., capacitors, resistors, etc.) can be soldered onto the circuit board and connected via various conductivity paths.

The term "microprocessor" as used herein may refer to a logic chip or a computer processor on a microchip. The microprocessor may have most or all central processing unit (CPU) functions.

The term "microcontroller" as used herein may refer to a CPU with additional function or structure, such as RAM, ROM, and or peripherals like I/O all embedded on a single chip.

The term "computer readable medium" (CRM) as used herein may refer to any type of medium that can store programming for use by or in connection with an instruction execution system, apparatus, or device. The CRM may be, for example, a device, apparatus, or system based on electronic, magnetic, optical, electromagnetic, or semiconductor function. By way of further example, the CRM may include an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical).

The term "monitoring module" as used herein may refer to one or more components operable to detect or otherwise measure a parameter, such as that associated with the operation of a top drive. For example, the monitoring module may be or include a sensor assembly.

The term "power swivel" as used herein may refer to a type of equipment used on a service rig or drilling rig, mainly to facilitate rotational operations. A power swivel may be powered, such as hydraulically or electrically, for handling or rotating tubulars, and may also act as a channel for drilling fluid. It also supports the weight of the drill string of pipe safely over men's heads. as used herein may refer to any driver machine or device suitable and known to one of ordinary skill in the art to impart work, typically in the form of suspending and rotating pipe. A power swivel or a top drive is an example of such a driver. A power swivel known to one of skill as being an alternative to and different from a rotary table.

The term "top drive" as used herein may refer to a type of equipment used on a service rig or drilling rig, mainly to facilitate rotational operations. The top drive may be akin to a power swivel, but with differences apparent to one of skill in the art.

The term "operatively coupled" (also "operatively associated", "operatively configured", etc.) as used herein may refer to one or more components working together (directly or indirectly) to accomplish or achieve a desired result in a manner to be understood generally by one of skill in the art.

Embodiments herein pertain to a monitored top drive system that may include a top drive in operable engagement with a work string. The top drive may be used in association with a drill rig or other suitable framework, and may include a rotatable member. However, although described herein referring to a top drive operable in an oil and gas environment, embodiments herein are just as applicable to other uses, such as municipal drilling for laying water or sewer lines.

The system may include a monitoring module (or component thereof) operatively coupled to the top drive. For example, a sensor assembly of the module may be coupled to an outer housing of the top drive. The sensor assembly may include an eddy current sensor disposed within a sensor housing, and the sensor housing (sealingly) disposed within a sidewall of the outer housing.

The sensor assembly may be configured to generate a system signal proportional to an amount of rotation of the rotatable member. In aspects, the rotatable member may have a profile configured to affect a magnetic field of the sensor assembly, or to otherwise change a variable like impedance. A microcontroller may be provided with computer instructions, and may be otherwise operable, for processing the system signal. The system signal may be in the form of a voltage or other comparable value.

Figure 2A:
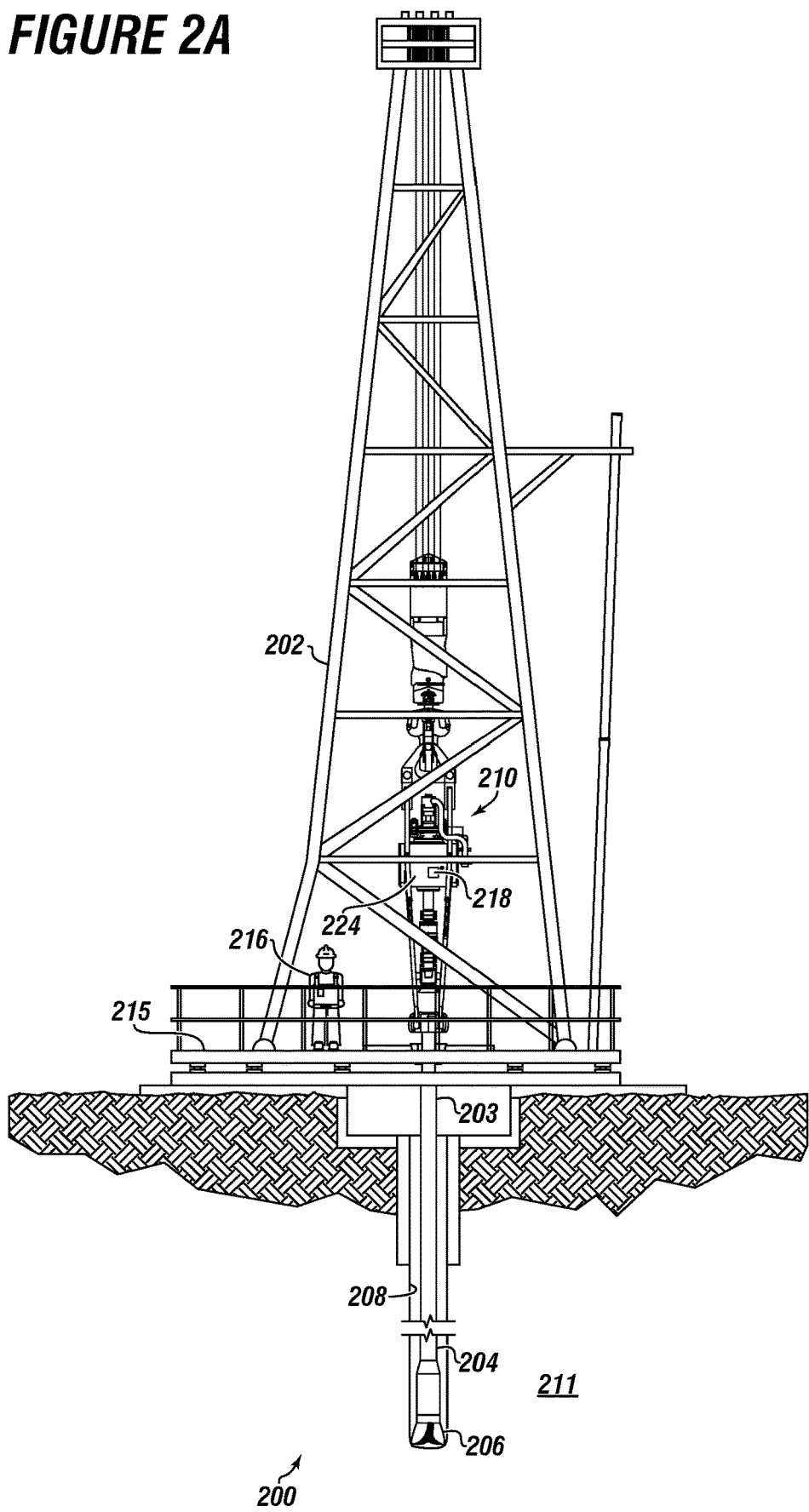
FIG. 2A shows a side view of a process diagram of a monitored top drive unit for a drilling system according to embodiments of the disclosure.
Figure 2B:
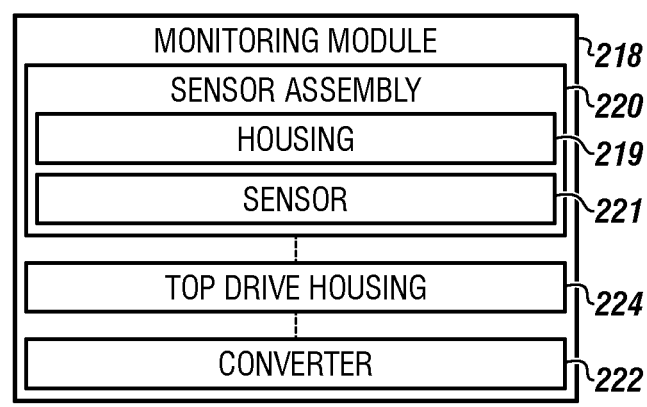
FIG. 2B shows a schematic box view of a monitoring module according to embodiments of the disclosure.
Figure 3A:
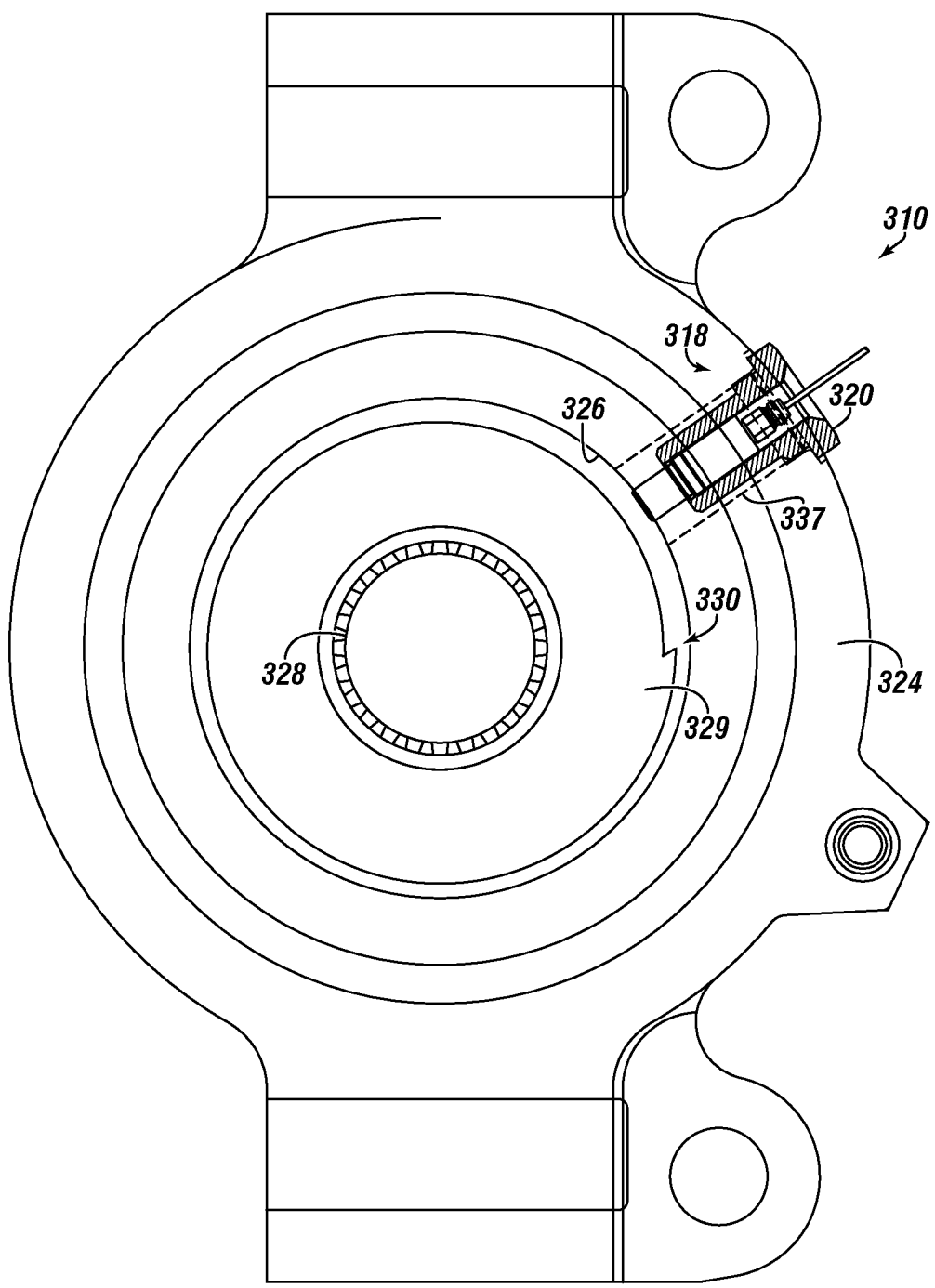
FIG. 3A shows a lateral downward view an open top drive unit having a sensor assembly according to embodiments of the disclosure.
Figure 3B:
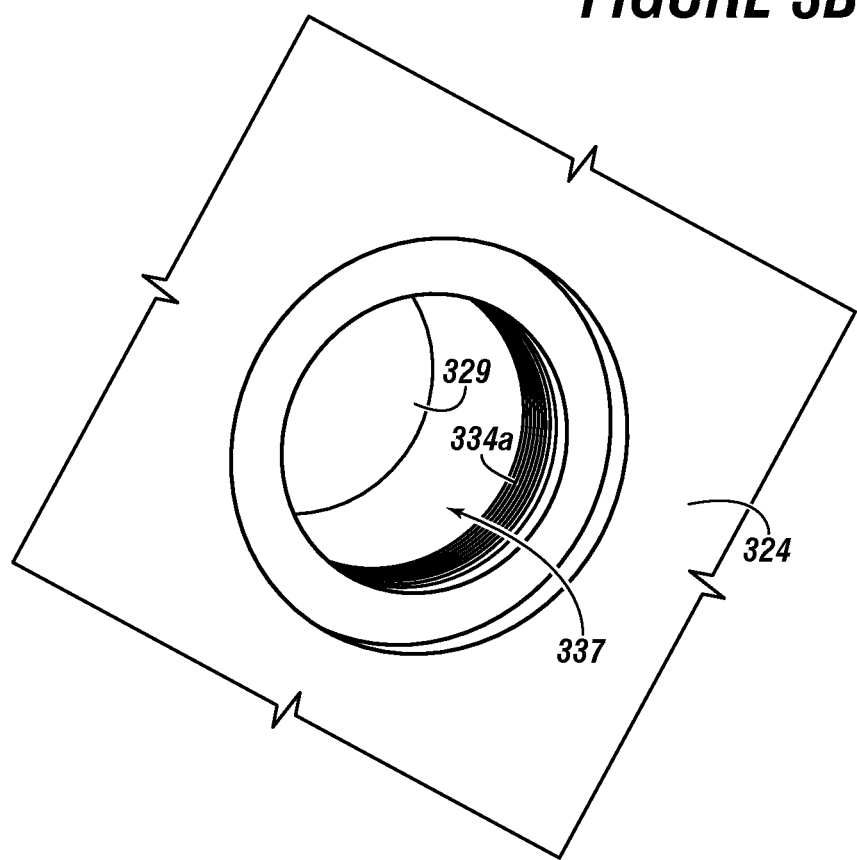
FIG. 3B shows a partial outer side view of a top drive housing according to embodiments of the disclosure.
Figure 3C:
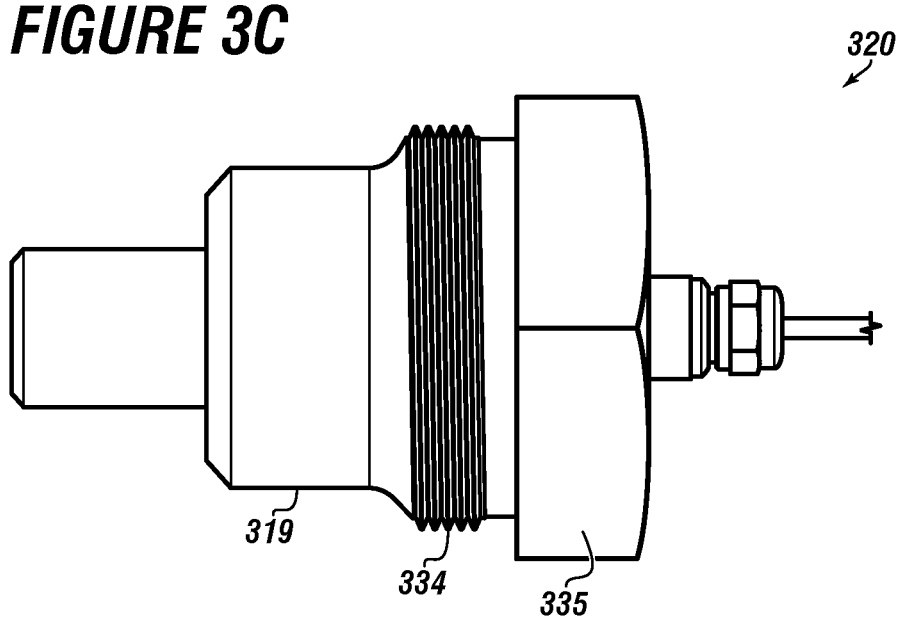
FIG. 3C shows a longitudinal side view of a sensor assembly according to embodiments of the disclosure.
Figure 3D:
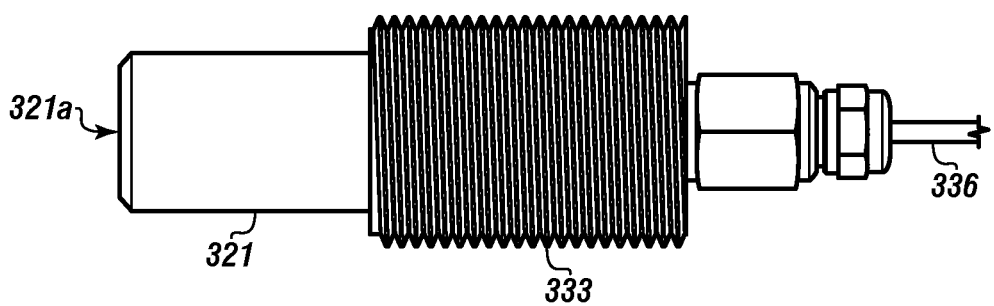
FIG. 3D shows a longitudinal side view of an eddy current sensor according to embodiments of the disclosure.

Referring now to FIGS. 2A and 2B together, a side process view of a drilling operation using a monitoring module coupled with a top drive, and a schematic box view of a monitoring module, respectively illustrative of embodiments disclosed herein, are shown. FIG. 2A shows a drilling operation 200 that utilizes a support structure, such as a derrick 202, in connection with a driver, such as top drive unit 210, for rotation of one or more tubulars 203 that may connect together to form a workstring 204. The workstring 204 may have one or more components associated with it (depending on job requirements), such as a drill bit 206. In this example, as the top drive unit 210 may rotate the workstring 204, the drill bit 206 rotation follows thereafter. Accordingly, a hole or wellbore 208 may be formed in a subterranean formation 211.

Various aspects of operation 200 may be automated and/or require manual contribution from an operator 216. In some instances, the operator 216 may be in a control room monitoring and/or controlling the operation (or portions thereof) via a workstation. The workstation (e.g., 338, FIG. 4), which may include a PC, laptop, mobile device, or the like, any of which configured with corresponding computer instructions, mobile applications, and so forth, along with a respective user interface) may be coupled with a monitoring module 218. The workstation (or associated components thereof) may be remote, onsite (such as on or proximate a rig floor 215), or partially both.

The monitoring module 218 may have one or more components coupled directly to or in close proximity to the top drive unit 210. Other components of the module 218 may be remote or offsite, with connection to the top drive unit 210 by way of hardwire, telemetry, Bluetooth, and the like. Although not shown in detail here, the monitoring module 218 may be coupled with any necessary wiring and the like in order to operatively configure the module 218 (such as a power cable, data transmission wiring, etc.).

The module 218 may include a sensor 221. The sensor 221 may be configured to measure or detect one or more operational aspects (parameters, variables, etc.) associated with the top drive unit 210. For example, the sensor 221 may be configured to detect rotation of a rotating stem of the top drive unit 210. Detection of rotation may further include RPM, direction, stem position, and the like. Detection of rotation may be via how the rotation of the top drive (or component thereof) 210 effects a magnetic field associated with the sensor 221.

The sensor 221 may be an eddy current sensor. As one of skill in the art would appreciate, an eddy current sensor may be configured to detect changes in a magnetic field that corresponds to a change of impedance. To aid measurement and operation, the sensor 221 may be disposed within a sensor housing 219. While the sensor 221 itself may be understood as having a body or housing with internals (coil, wiring, circuit board, etc.), the sensor housing 219 may be beneficial to provide universal coupling capability between the sensor 221 and any given top drive unit 210.

The sensor 221, the housing 219, and related components, may be part of a sensor assembly 220. As such, the sensor assembly 220 may be configured for coupling with the top drive unit 210. For example, the sensor assembly 220 may be installed into a top drive unit housing or sidewall 224. In this respect, the sensor 221 may be readily proximate or substantially adjacent the drill stem (e.g., a distal end of the sensor 221 about 1 inch or less from an external surface of the drill stem). The top drive housing 224 may be sealingly enclosed, whereby a fluid may be maintained within the housing. The top drive housing 224 may be pressurized.

Referring now to FIGS. 3A, 3B, 3C, and 3D together, a lateral downward view an open top drive unit having a sensor assembly; a partial outer side view of a top drive housing; a longitudinal side view of a sensor assembly; and a longitudinal side view of an eddy current sensor, in accordance with embodiments herein, are shown.

While it need not be exactly the same, top drive unit 310 and monitoring module 318 (or its subcomponents) may be like that as described for any system described herein (such as system 200), and components thereof may be duplicate or analogous. Thus, only a brief discussion of operation thereof may be provided, recognizing that differences, if any, would be discernable by one of skill in the art.

Embodiments herein apply to an industrial operation or process that may involve the rotation of a tubular, and may have a number of components and subcomponents, which may be further associated with operable systems, subsystems, assemblies, modules, and so forth that may overall be referred to as a system, such as a monitored system (200). Top drive unit 310, and any components thereof, may be like that as used for other systems described herein or in the Applications, or comparable embodiments.

The top drive unit 310 may have a top drive motor (not viewable here) coupled with a shaft or rotating member 328.

The rotating member 328 may also be referred to as a drive stem. The drive stem 328 (or portion thereof) may have a top drive housing 324 disposed therearound. This configuration may provide for an inner top drive chamber 326. The inner top drive chamber may be filed with a utility fluid, such as a lubricant, which may be beneficial for purposes of keeping the top drive unit 310 operating smoothly for a lifetime thereof. That is, the top drive unit 310 may often have one or more surfaces rotating come into contact with other surfaces, and the use of a lubricant may help prevent wear and tear therebetween. The inner top drive chamber 326 may also be (sealingly) enclosed, whereby a pressurized fluid (above atmospheric) may be kept therein.

The drive stem 328 may have an enlarged portion, such as hub 329, disposed therearound or integral therewith. The hub 329 may be configured (such as by CNC machining, additive manufacturing, and the like) with a profile 330. The presence of the profile 330 may be such that it promotes or otherwise causes a change in a magnetic field between one or more points of the top drive unit as the profile 330 rotates. The change in magnetic field may be measured by sensor assembly 320 (or its sensor 321).

The sensor assembly 320 may be disposed within the top dive housing 324 (such as the sidewall thereof). Accordingly, the top drive housing 324 may have a sensor assembly bore 337. The sensor assembly 320 may be configured to couple with the top drive housing, such as via threads 334, 334a. Although shown here as threaded, embodiments herein are not meant to be limited, and other coupling configurations may be possible. It is also within the scope of the disclosure that the sensor 321 may be formed integral with the top drive unit 310 (or housing 324).

The sensor 321 may be configured to detect a magnetic field (or a change thereto). An end 321a of the sensor 321 may be positioned proximate to the hub 329. In aspects, upon installation of the assembly 320 into the top drive unite 310, the maximum distance between the end 321a and the hub may be about 1 inch or less.

The sensor 321 may be an eddy current sensor. The sensor 321 may be disposed (e.g., threadingly) within a housing 319 of the sensor assembly 320. As such, the housing 319 may have a receptacle configured for engagement with sensor thread profile 333. To ensure sufficient coupling, the sensor assembly 320 may have a tool handling surface 335, whereby a tool or hand may hold the assembly 320 (such as to screw into receptacle 337 of top drive housing 324).

In operation, as the drill stem 328 (and thus profile 330) rotates, the magnetic field around the sensor 321 may change as a result of influence of and the profile 330 thereby. The sensor 321 may thus be configured (calibrated, etc.) to detect the effect of the profile 330 on the nearby field.

The sensor 321 may also be configured to provide a signal output based on this detection. The signal output may be a voltage or other form of useful signal. The signal may be digital or analog. The signal may be transferred from the sensor 321 via an output transfer 336, such as wiring. The output transfer 336 may be coupled with another component of a monitoring module, or external thereto.

Figure 4:
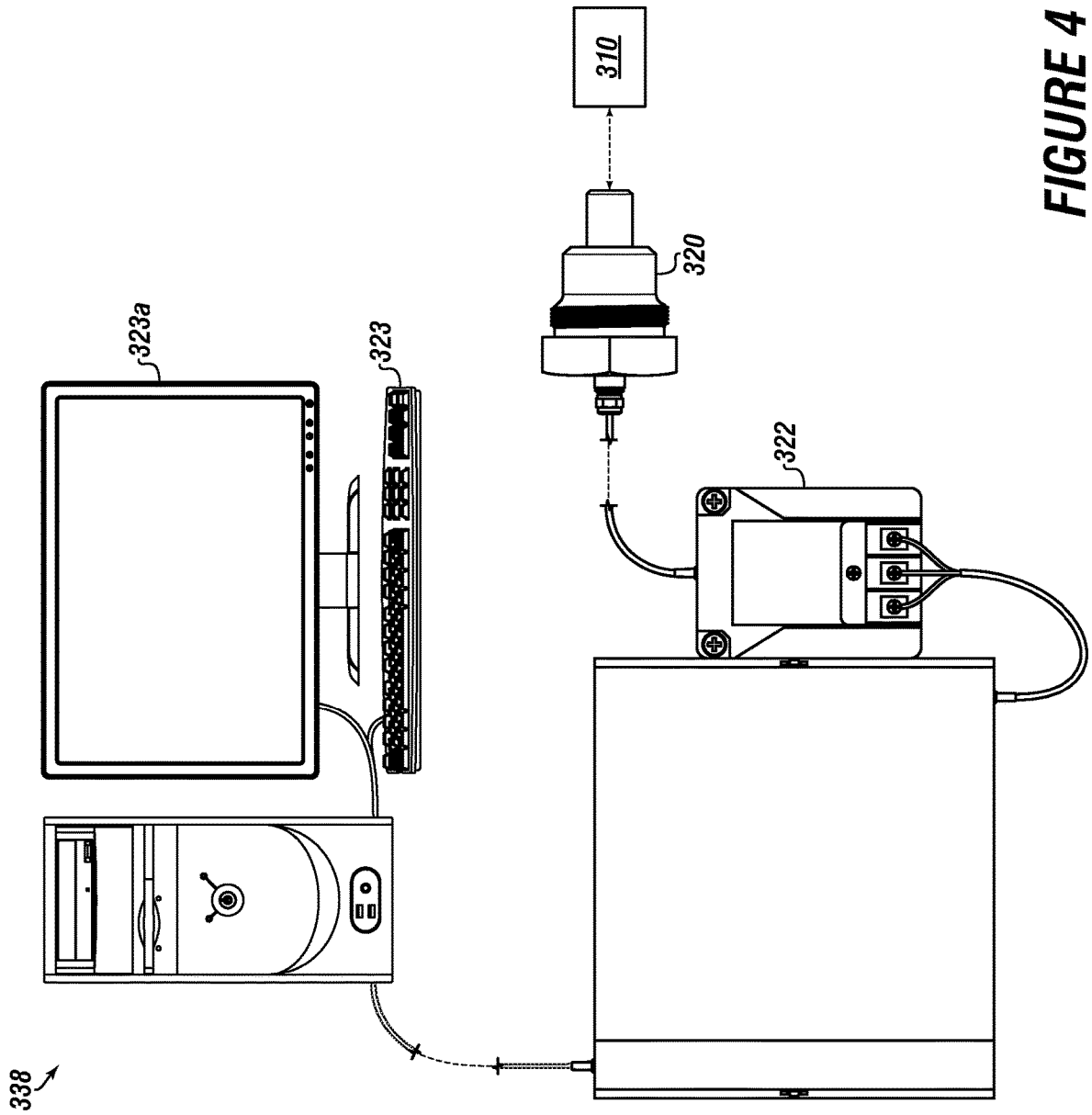
FIG. 4 shows a modular component view of equipment associated with a monitoring module according to embodiments of the disclosure.

Referring briefly to FIG. 4, a simplified modular component view of equipment associated with a monitoring module, in accordance with embodiments herein, is shown.

FIG. 4 illustrates the sensor assembly 320 (operatively coupled with the top drive unit 310) may be coupled with a converter (or other form of data/signal processor) 322. The converter 322 may be configured (such as through hardware and/or software) to convert data (signal, information, etc.) from the sensor assembly 320 to be useable with desired programming of a workstation 338. As such, operational aspects of the top drive unit 310 may ultimately be detected and converted into useful format for an end user to see on the workstation 338 (such as on a display 323a).

The transfer of information between the top drive unit 310, the sensor assembly 320, the workstation 338, and so forth, may be via hardwiring; however, other operable connections are possible, such as telemetry, and combinations thereof. Broken lines between connections are meant to illustrate that the connections need not be nearby and/or that other equipment may be installed therebetween.

The workstation 338 may be or otherwise include a mobile device (configured with a respective mobile application). The workstation 338 may also be configured for a user or operator to control the operation of the top drive unit 310. The workstation 338 may be associated with a user interface, such as a keyboard and mouse 323.

Figure 5A:
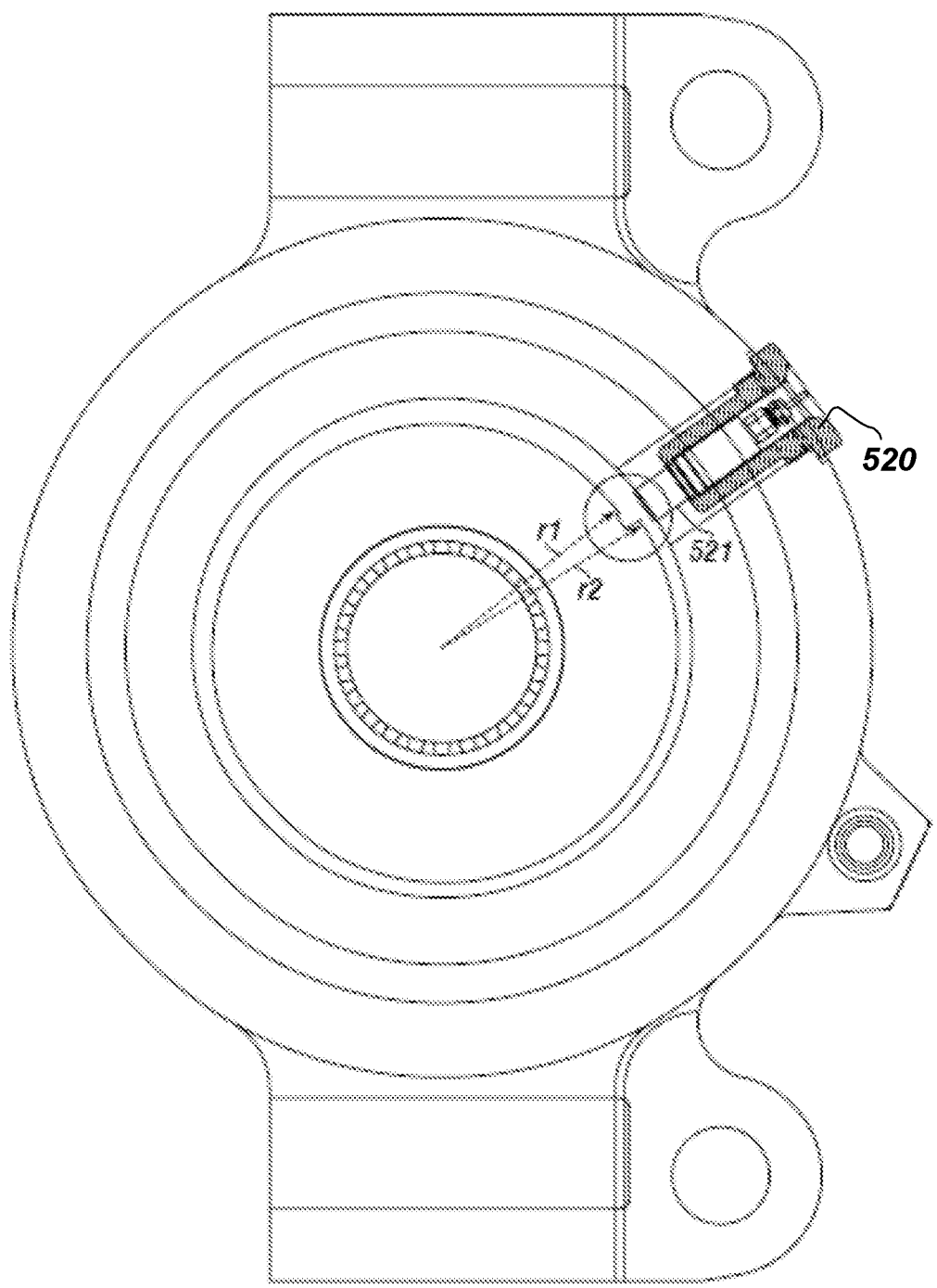
FIG. 5A shows a lateral cross-sectional view of a sensor end proximate to a hub profile according to embodiments of the disclosure.

Referring now to FIGS. 5A, 5B, 5C and 5D together, a lateral cross-sectional view of a sensor end proximate to a hub profile; a zoom-in view of the sensor end and hub profile of Figure; a partial longitudinal side view of the hub profile of FIG. 5A/5B; and a waveform associated with an output of a sensor assembly, in accordance with embodiments disclosed herein, are shown.

Figure 5B:
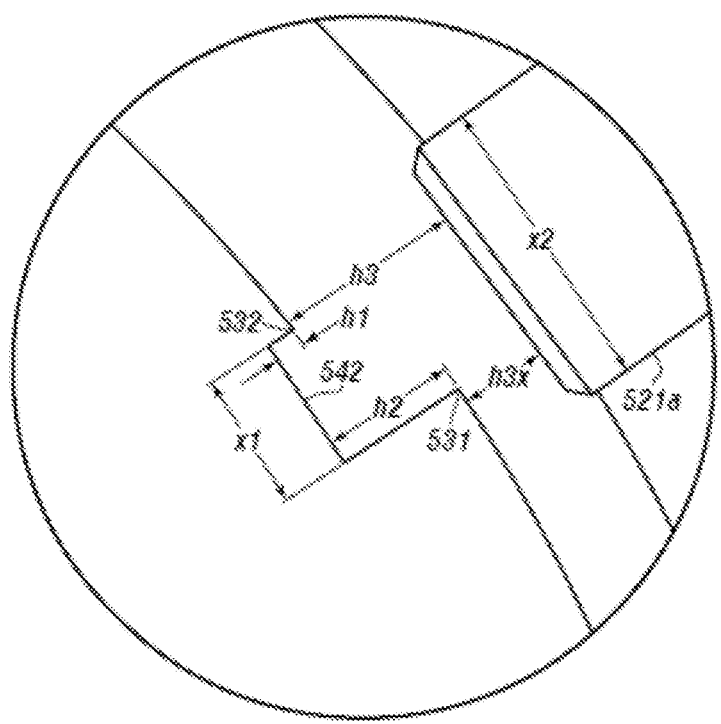
FIG. 5B shows a zoom-in view of the sensor end and hub profile of Figure A according to embodiments of the disclosure.
Figure 5C:
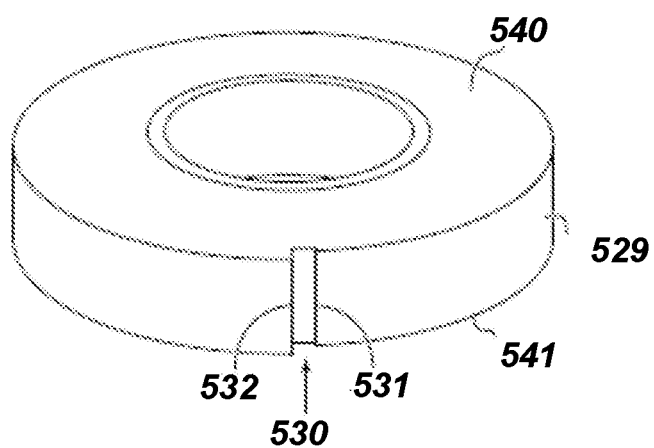
FIG. 5C shows a partial longitudinal side view of the hub profile of FIG. 5A according to embodiments of the disclosure.

FIGS. 5A and 5B show a longitudinal side profile of a rotating member 528 that may be part of a top drive unit. The top drive unit may be like that of those described herein, such as unit(s) 210, 310, and the like.

The rotating member 528 may have a hub portion 529. Although not limited to any particular shape, the hub 529 may be generally cylindrical and shape, and having an outer hub surface configured with a profile 530. The hub 529 may have a larger OD than other portions of the rotating member 528.

The profile 530 may singular in nature, such as an edge or a protrusion. Just the same, the profile 530 may define a particular configuration of the hub 529. FIG. 5A shows in lateral cross-section that the profile 530 may be a constant increasing (or vice vera) radius around a 360-degree rotation. That is, to the naked eye, or perhaps with the aid of machine, a given point on the profile will have a radius r1, while another point will have a radius r2, where r2 is greater than r1.

The maximum delta in radial distance may occur between the radial of edge 531 and that of edge 532. Either of the edges 531, 532 may extend along the outer surface of the hub (and in parallel to a longitudinal axis of the hub 529). Either of the edges 531, 532 may extend an entire length from a first hub end 540 to a second hub end 541. The edge 531 may extend radially outward from a null or void portion 542 at a height h1. The edge 532 may extend radially outward from the null 542 at a height h2. The difference between h2 and h1 may be equivalent to that of the change in radial around the hub 529.

The profile 530 may have a relationship with a sensor 521, whereby the sensor 521 may be configured to detect or measure a parameter associated with rotation of the profile 530. A particular characteristic of distinction to note is that the sensor 521 need not measure rotations of the hub 529 per se; instead, the sensor 521 may measure the hub 529 as it moves between its min and max range of the profile 530 (could be in either direction). In embodiments, to calibrate the sensor assembly 520, the hub 529 may be rotated one revolution.

For example, the sensor 521 may be an eddy current sensor configured to provide a signal based on a change in the magnetic field of the sensor 521 as it is affected by movement of the profile 530. The variation may be the result of change in 'height' (or distance) between edges 531, 532 and that of the sensor end 521a. For example, at the start of rotation of the hub 530, the end 521a of the sensor may be a height h3 away from the edge 532. Upon completion of (an approximate) revolution, the end 521 may be a height h3x away from the edge 531, the difference being equivalent to the change between r1 and r2 at the same points, and this difference corresponding to a change in impedance associated with the sensor 521.

Accordingly, the Applicant has discovered how to measure or otherwise detect properties associated with rotation, by using what is tantamount to a linear approximation. This may be illustrated by briefly referring to FIG. 5D, which shows by way of example a waveform that may be associated with a signal generated by (or proportional to) the sensor 521. As would be apparent, the signal may be a sawtooth wave. As also mentioned herein, the sensor 521 may be static, and thus not rotate; instead, the sensor detects changes in a magnetic field influenced by the rotating profile 530. At point 0, the sensor 521 may be most proximate (or directly lateral) to the null or reset 542, which may correspond to a zero or reset on the graph (along the x-axis). At the initial start of rotation, the edge 532 passes closest to the sensor end 521a, and the wave begins to increase. With continued rotation all the way to the edge 531 being closest (radially) to the end 521a of the sensor 521, so corresponds the change in the wave all the way to its crest. As the null 542 reaches the sensor end 521a, the reset of the wave back to its zero may occur. The cycle may be repeated with each rotation. They y-axis may correspond to the change in radial of the profile 530 (or proportionately to the change in height or distance between the sensor end 521a and the profile). The downslope from the crest may be the portion of the wave corresponding to the sensor 521 reading the null 542 (approximately a linear distance on the x-axis equivalent to about x1).

The profile 530 from edge 532 to edge 531 (or vice versa) may be contemplated as a constantly increasing radius (or oppositely, decreasing radius) [as one of skill would appreciate in lateral cross section]. The rate of change may be about 0.1 inches per degree to about 0.2 inches per degree. The rate of change may be about 0.140 inches per degree. In embodiments the rate of change may be about 0.1 inches to about 0.4 inches.

The Applicant has further discovered unexpectedly that the presence of the null 542 may aid and facilitate the ability to obtain precise and accurate information associated with rotation of the hub 530 (and thus operation the top drive unit [e.g., 310]). That is, without the use of the null 542, the sensor 521 may operate erroneously.

In embodiments, a null value may be useful to create a dimensional zone that is not consistent with the slope rate around the circumference of the measured hub. By incorporating the null area it allows an associated computer program to effectively create a blank spot (i.e., a new dimension that falls outside the given parameters) in the tolerance measured distance in order to prevent the program to confuse the rotational inclination (or declination) slope as seen in FIG. 5D as noted R1, R2, R3 etc. for the vertical fall or reset at position R indicating a new revolution.

It may be important for the computer program analyzing this wave profile to not confuse the slope for the fall because the fall represents the entirety of the slope dimension in one position, whereby if the rotation were to stop with the sensor at the pentacle of the slope, the sensor would be unable to distinguish where on the slope it was and simply provide readings for all dimensions on the slope. With the null incorporated, a programmer may place a constant value to recognize this null (for example, as a two (2) degree spot on the 360 deg measurement of rotation) so that it reads a constant value.

Figure 5D:
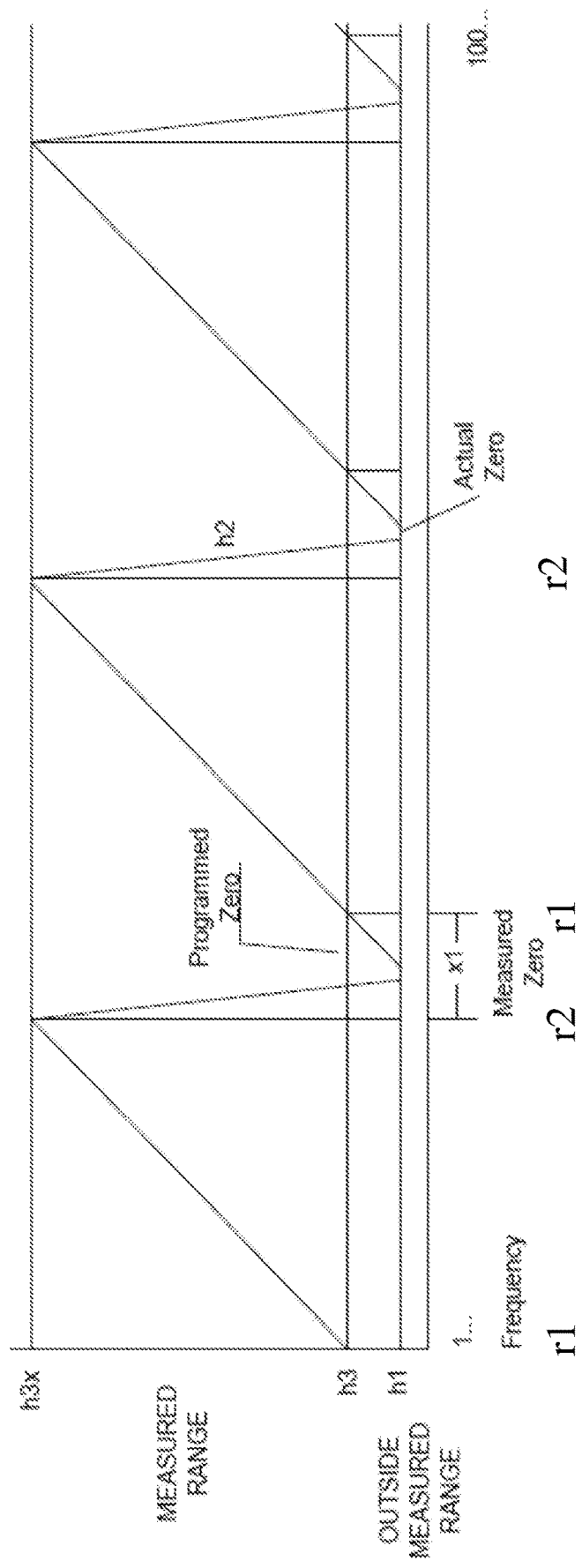
FIG. 5D shows a waveform associated with an output of a sensor assembly according to embodiments of the disclosure.

In some embodiments it is of significance that in the use of a single sensor there may be a full scale decreasing/increasing radial arc around the circumference of the hub with a window spot that falls outside the desired measured range in order to produce a full range measured window of the entire circumference with one spot that is programmatically changed to a zero constant (see, e.g., FIG. 5D waveform).

This window may be at minimum one/half the diameter of the sensor face due to the nature of magnetic, Eddie current, ultrasonic, or light measurement technology. This is because of potential limitation of the sensor and the profile of the hub without the zero or outside range measurement. To explain—if a hub is created where r1 and r2 are joined with the same cut line (a simple step profile) and any sensor of any type were to be proximate on that edge, the sensor might become confused or fail to operate properly because the height of the step is the total height of the entire circumference of the hub in one point.

Regardless of how fine one is able to make the reading window of the sensor may be a point where this is true and the sensor will not be able to read a constant, which may translate to static noise encompassing the entire range all at once. Therefore, there may be beneficial purpose for the cut and a need for a spot that is not the same as any measured distance around the hub. The size of this zero space (or null) is relative to the sensor reading the profile. This only translates to resolution of the system (e.g., the bigger the space between r1 and r2 decreases the resolution comparative to the total circumference of the hub)

Embodiments of the present disclosure are described in detail with reference to the accompanying Figures. In the following discussion and in the claims, the terms "including" and "comprising" are used in an open-ended fashion, such as to mean, for example, "including, but not limited to . . . ". While the disclosure may be described with reference to relevant apparatuses, systems, and methods, it should be understood that the disclosure is not limited to the specific embodiments shown or described. Rather, one skilled in the art will appreciate that a variety of configurations may be implemented in accordance with embodiments herein.

Although not necessary, like elements in the various figures may be denoted by like reference numerals for consistency and ease of understanding. Numerous specific details are set forth in order to provide a more thorough understanding of the disclosure; however, it will be apparent to one of ordinary skill in the art that the embodiments disclosed herein may be practiced without these specific details. In other instances, well-known features have not been described in detail to avoid unnecessarily complicating the description. Directional terms, such as "above," "below," "upper," "lower," "front," "back," etc., are used for convenience and to refer to general direction and/or orientation, and are only intended for illustrative purposes only, and not to limit the disclosure.

Connection(s), couplings, or other forms of contact between parts, components, and so forth may include conventional items, such as lubricant, additional sealing materials, such as a gasket between flanges, PTFE between threads, and the like. The make and manufacture of any particular component, subcomponent, etc., may be as would be apparent to one of skill in the art, such as molding, forming, press extrusion, machining, or additive manufacturing. Embodiments of the disclosure provide for one or more components to be new, used, and/or retrofitted to existing machines and systems.

Various equipment may be in fluid communication directly or indirectly with other equipment. Fluid communication may occur via one or more transfer lines and respective connectors, couplings, valving, piping, and so forth. Fluid movers, such as pumps, may be utilized as would be apparent to one of skill in the art.

Numerical ranges in this disclosure may be approximate, and thus may include values outside of the range unless otherwise indicated. Numerical ranges include all values from and including the expressed lower and the upper values, in increments of smaller units. As an example, if a compositional, physical or other property, such as, for example, molecular weight, viscosity, melt index, etc., is from 100 to 1,000. it is intended that all individual values, such as 100, 101, 102, etc., and sub ranges, such as 100 to 144, 155 to 170, 197 to 200, etc., are expressly enumerated. It is intended that decimals or fractions thereof be included. For ranges containing values which are less than one or containing fractional numbers greater than one (e.g., 1.1, 1.5, etc.), smaller units may be considered to be 0.0001, 0.001, 0.01, 0.1, etc. as appropriate. These are only examples of what is specifically intended, and all possible combinations of numerical values between the lowest value and the highest value enumerated, are to be considered to be expressly stated in this disclosure. Numerical ranges are provided within this disclosure for, among other things, the relative amount of reactants, surfactants, catalysts, etc. by itself or in a mixture or mass, and various temperature and other process parameters.

While preferred embodiments of the disclosure have been shown and described, modifications thereof may be made by one skilled in the art without departing from the spirit and teachings of the disclosure. The embodiments described herein are exemplary only and are not intended to be limiting. Many variations and modifications of the embodiments disclosed herein are possible and are within the scope of the disclosure. Where numerical ranges or limitations are expressly stated, such express ranges or limitations should be understood to include iterative ranges or limitations of like magnitude falling within the expressly stated ranges or limitations. The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the preferred embodiments of the present disclosure. The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

What is claimed is:

1. A top drive system comprising:
   a drilling rig;
   a top drive unit operatively associated with the drilling rig, the top drive further comprising:
   a top drive housing; and
   a rotatable member having a first member portion within the top drive housing,
   and a second member portion extending outward from the top drive housing;
   a monitoring module comprising:
   an eddy current sensor assembly disposed within the top drive housing, the assembly comprising an eddy current sensor configured to provide an output signal associated with an at least one parameter of the top drive;
   a converter unit operable to receive and convert the output signal into a sawtooth wave signal, and transfer to the sawtooth wave signal to a workstation;
   wherein the first member portion is configured with a profile sensed by the eddy current sensor assembly.

2. The top drive system of claim 1 further comprising:
   a user interface in operable communication with the eddy current sensor assembly and the workstation.

3. The top drive system of claim 1, wherein the first member portion is generally cylindrical, and further comprising:
   a top side;
   a bottom side; and
   an outer side surface,
   and wherein the outer side surface is configured with the profile.

4. The top drive system of claim 3, wherein the profile further comprises in lateral cross-section: a first edge having a radius r1, a second edge having a radius r2, and a null having a radius $r_{null}$, wherein $r2>r1>r_{null}$.

5. The top drive system of claim 4, wherein in lateral cross-section an outer radial between the first edge and the second edge increases in radial size at a rate in a range of 0.1 inches to 0.4 inches.

6. The top drive system of claim 4, wherein at least one of the first edge and the second edge extends entirely between the top side and the bottom side.

7. The top drive system of claim 4, wherein a clearance between an end most surface of the sensor and a most lateral proximate point of the hub is no more than 1 inch.

8. The top drive system of claim 5, wherein the end most surface of the sensor has an end width x2, wherein the null has a width x1, and wherein x1 is greater than or equal to ½*x2.

9. The top drive system of claim 8, wherein the second member portion is coupled with a workstring made of a plurality of tubulars coupled together, and wherein a drillbit is coupled with a downhole end of the workstring.

10. A top drive system comprising:
    a drilling rig;
    a top drive unit operatively associated with the drilling rig, the top drive further comprising:
    a top drive housing; and
    a rotatable member having a first member portion within the top drive housing,
    and a second member portion extending outward from the top drive housing;
    a monitoring module comprising:

an eddy current sensor assembly disposed within the top drive housing, the assembly comprising an eddy current sensor configured to provide an output signal associated with an at least one parameter of the top drive;

wherein the first member portion is configured with a profile sensed by the eddy current sensor assembly.

11. The top drive system of claim 10, wherein the system further comprises a converter unit operable to receive and convert the output signal into a sawtooth wave signal.

12. The top drive system of claim 11 further comprising a workstation in operable communication with the eddy current sensor assembly, wherein the first member portion is generally cylindrical, and further comprising:
    a top side;
    a bottom side; and
    an outer side surface,
and wherein the outer side surface is configured with the profile.

13. The top drive system of claim 11, wherein the profile further comprises in lateral cross-section: a first edge having a radius r1, a second edge having a radius r2, and a null having a radius $r_{null}$, wherein $r2>r1>r_{null}$.

14. The top drive system of claim 13, wherein in lateral cross-section an outer radial between the first edge and the second edge increases in radial size at a rate in a range of 0.1 inches to 0.4 inches.

15. The top drive system of claim 14, wherein a clearance between an end most surface of the sensor and a most lateral proximate point of the hub is no more than 1 inch.

16. The top drive system of claim 15, wherein the end most surface of the sensor has an end width x2, wherein the null has a width x1, and wherein x1 is equal to or greater than ½*x2.

17. The top drive system of claim 15, wherein the second member portion is coupled with a workstring made of a plurality of tubulars coupled together, and wherein a drillbit is coupled with a downhole end of the workstring.

18. A top drive system comprising:
    a drilling rig;
    a top drive unit operatively associated with the drilling rig, the top drive further comprising:
        a top drive housing; and
        a rotatable member having a first member portion within the top drive housing, and a second member portion extending outward from the top drive housing;
    a sensor assembly disposed within the top drive housing, the assembly comprising a sensor configured to generate an output signal associated with an at least one parameter of the top drive;
wherein the first member portion is generally cylindrical, and further comprising: a top side; a bottom side; and an outer side surface, wherein the outer side surface is configured with the profile that comprises in lateral cross-section: a first edge having a radius r1, a second edge having a radius r2, and a null having a radius $r_{null}$, wherein $r2>r1>r_{null}$.

* * * * *